March 16, 1965 H. J. DANA 3,173,208
APPARATUS FOR MEASURING FOOT LENGTH
Filed Aug. 16, 1962 8 Sheets-Sheet 1
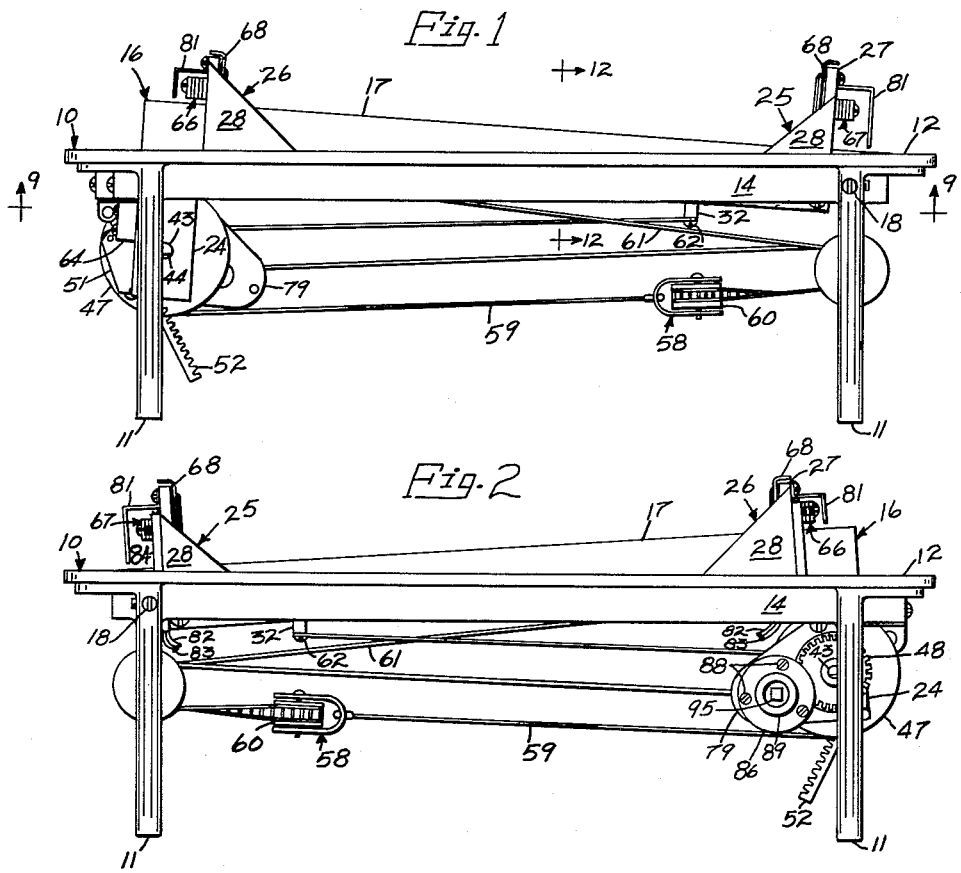
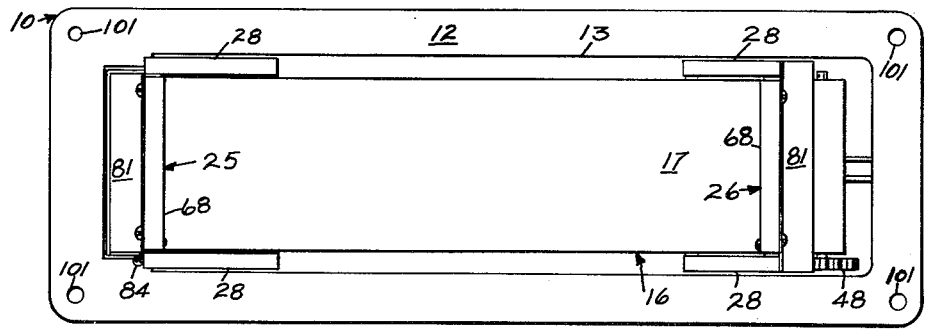
INVENTOR.
Homer J. Dana
BY Wells & St. John
Attys.

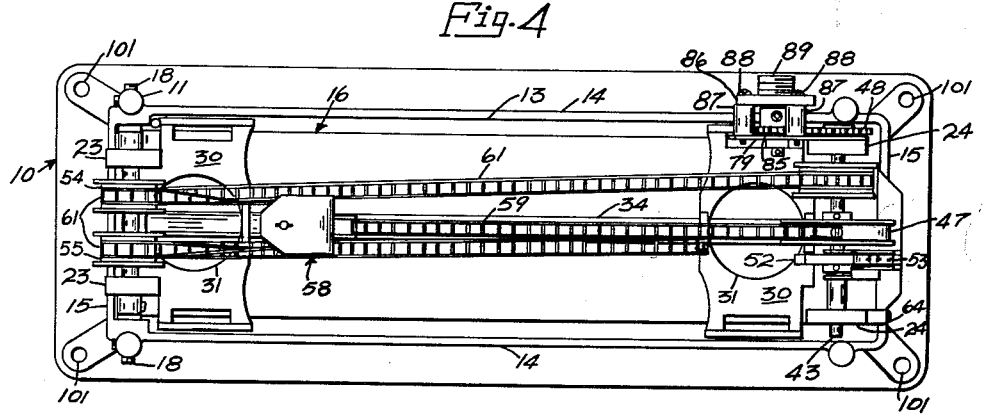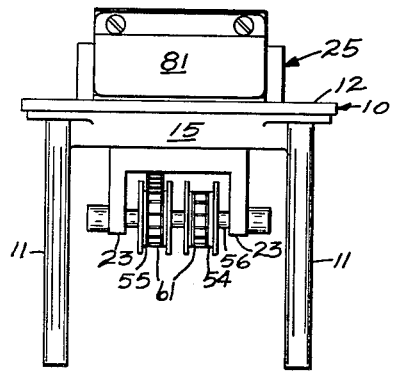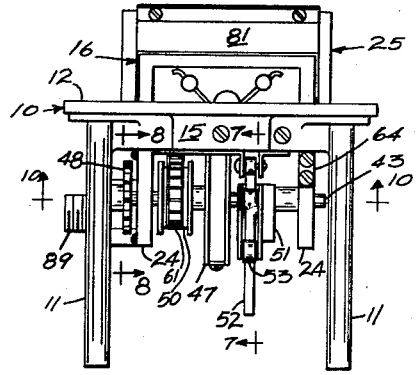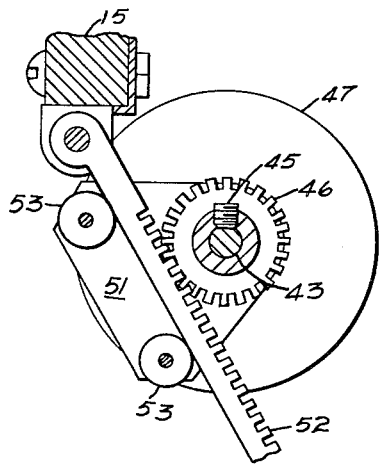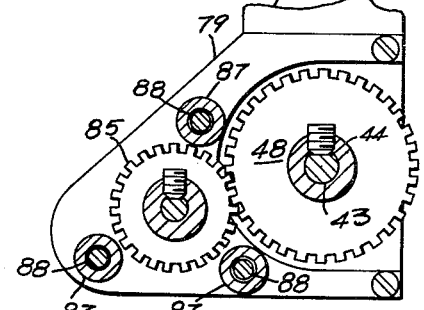

INVENTOR.
Homer J. Dana
BY *Wells & St. John*
Attys.

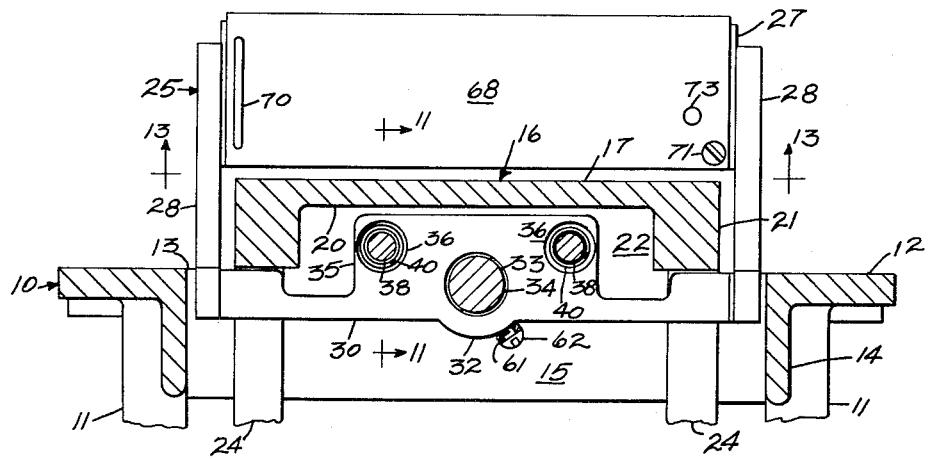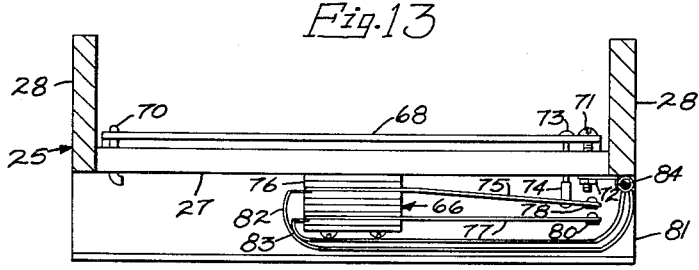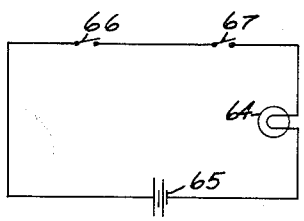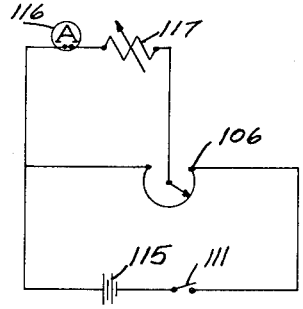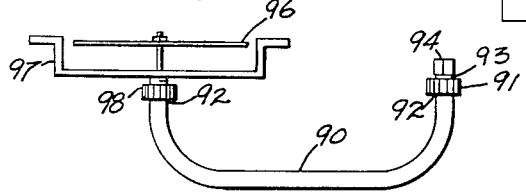

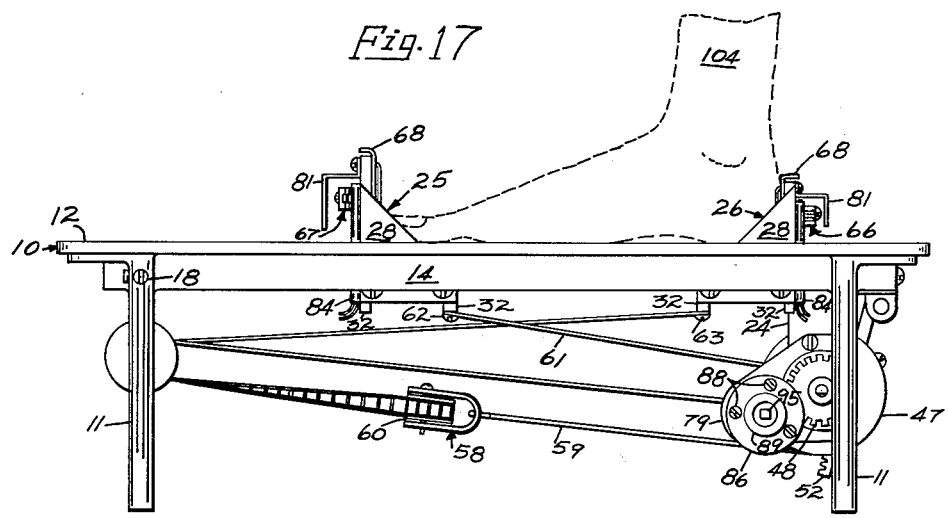
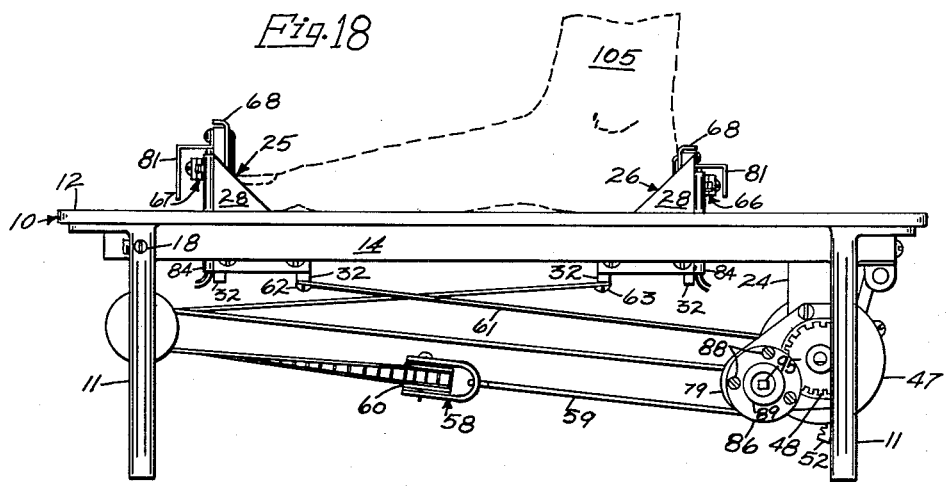

March 16, 1965    H. J. DANA    3,173,208
APPARATUS FOR MEASURING FOOT LENGTH
Filed Aug. 16, 1962    8 Sheets-Sheet 6
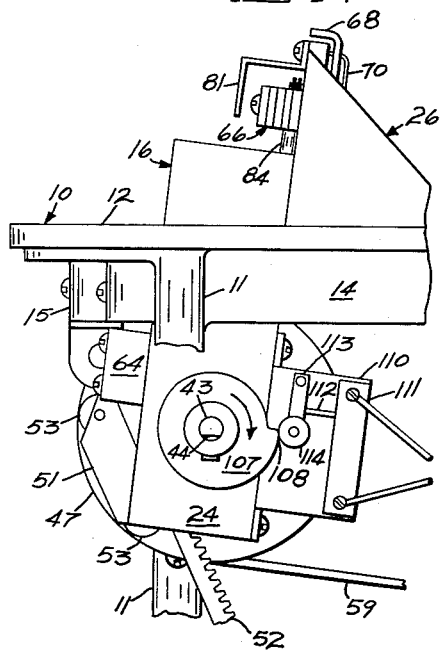
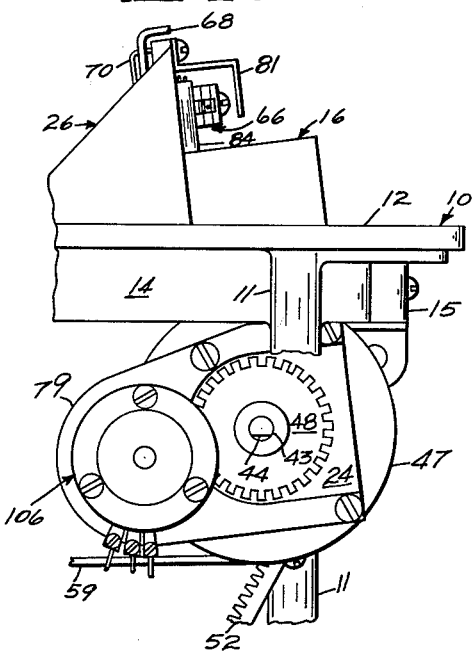
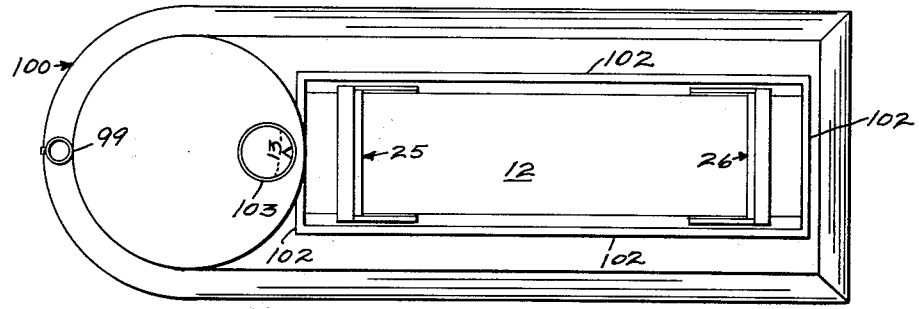
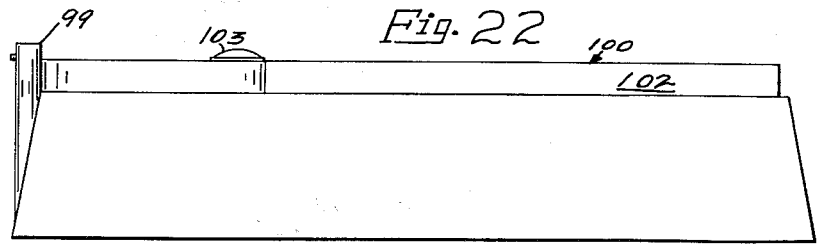
INVENTOR.
Homer J. Dana
BY Wells & St. John
Attys.

March 16, 1965 H. J. DANA 3,173,208
APPARATUS FOR MEASURING FOOT LENGTH
Filed Aug. 16, 1962 8 Sheets-Sheet 7
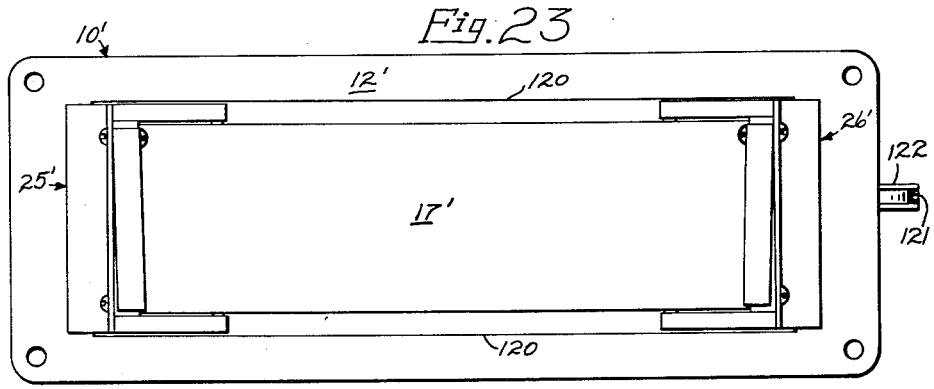
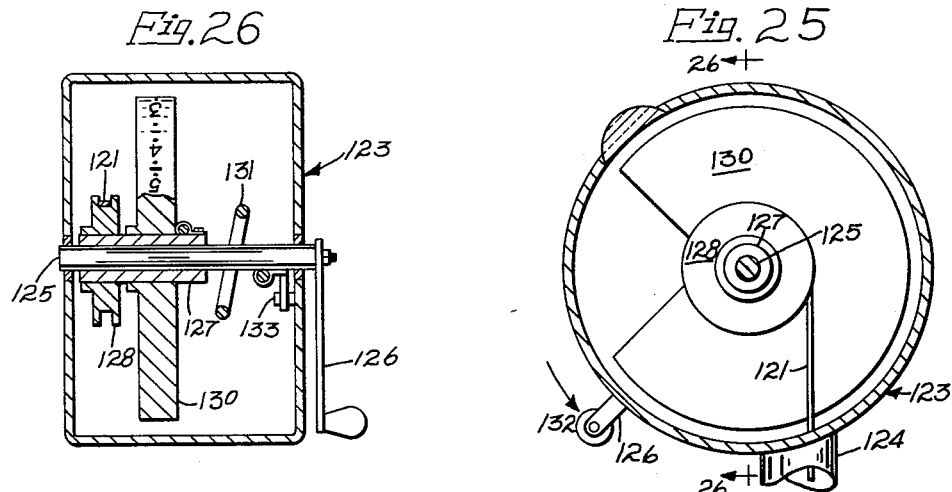
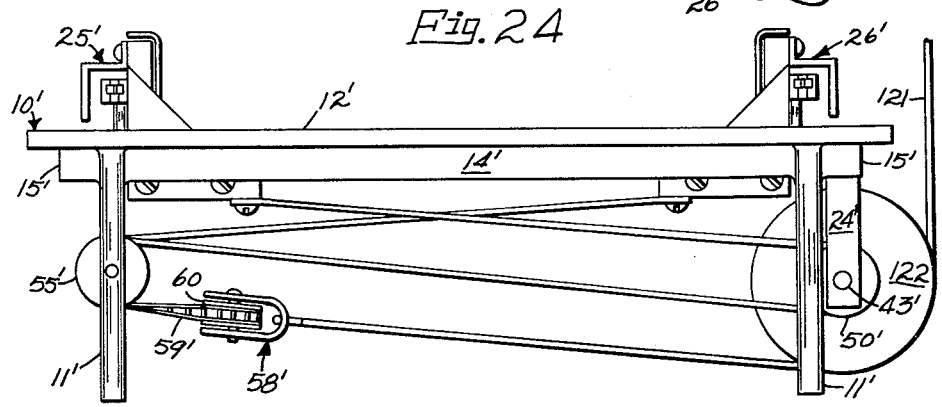
INVENTOR.
Homer J. Dana
BY *Wells & St. John*
Attys.

March 16, 1965  H. J. DANA  3,173,208
APPARATUS FOR MEASURING FOOT LENGTH
Filed Aug. 16, 1962  8 Sheets-Sheet 8
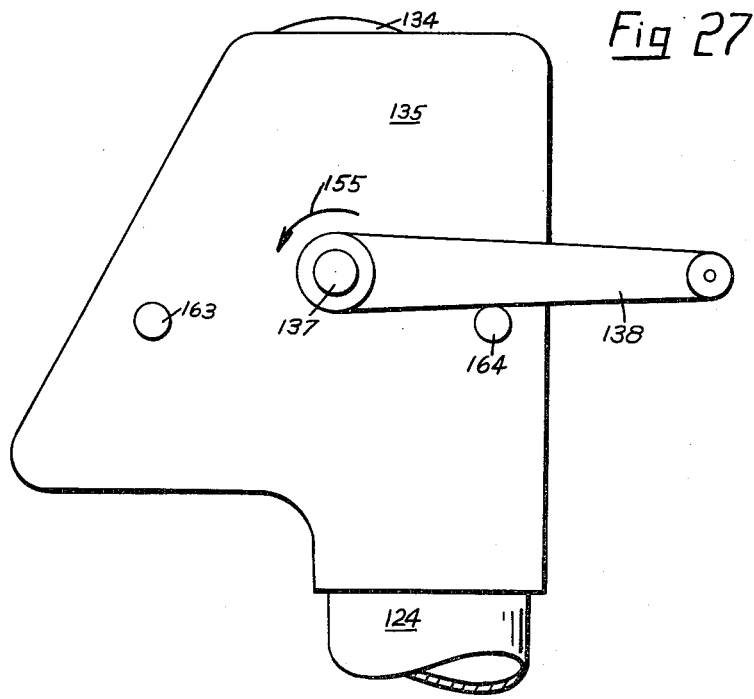
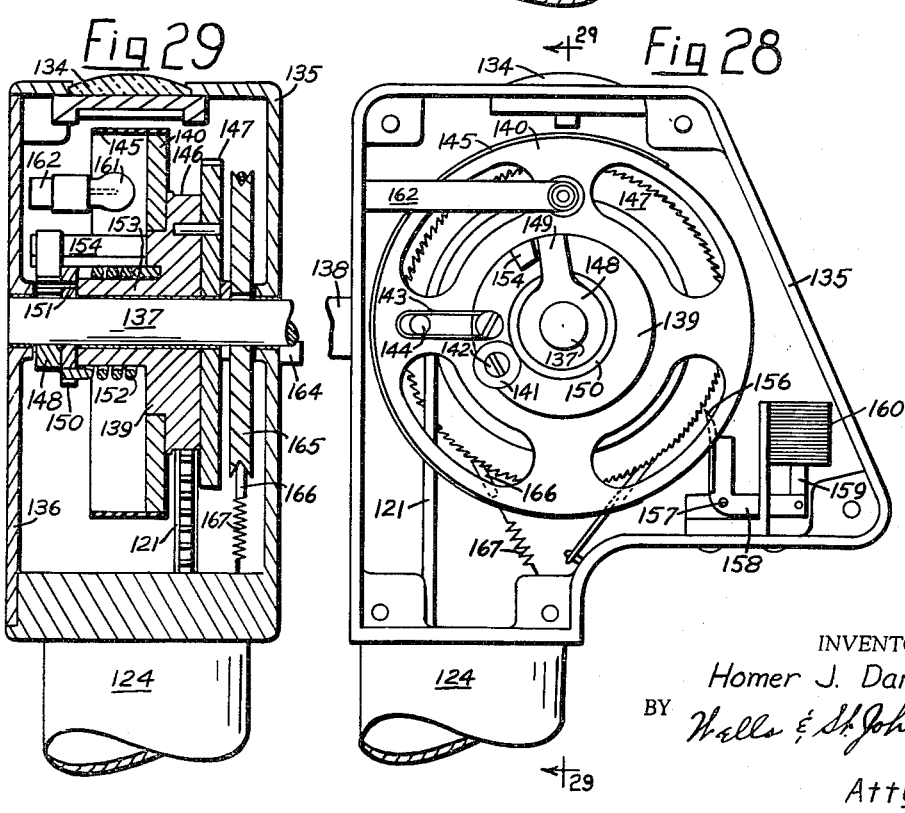
INVENTOR.
Homer J. Dana
BY *Wells & St. John*
Attys.

United States Patent Office 3,173,208
Patented Mar. 16, 1965

1

3,173,208
APPARATUS FOR MEASURING FOOT LENGTH
Homer J. Dana, 703 Linden St., Pullman, Wash.
Filed Aug. 16, 1962, Ser. No. 218,219
20 Claims. (Cl. 33—3)

This is a continuation-in-part of my application, Serial Number 58,448, filed September 26, 1960, now abandoned.

This invention relates to a novel apparatus designed to measure the length of a person's foot for purposes of fitting correct shoes on the individual.

The apparatus described and claimed herein is specifically designed for use in conjunction with a self service type of sales promotion. It may be used in any retail outlet capable of displaying a supply of shoes and maintaining a constant inventory. It requires no trained sales staff and little maintenance. The apparatus is entirely governed by the customer and has such simple operation that it can be universally operated with resulting efficiency and accuracy.

It is a first object of this invention to provide a foot measuring apparatus which will automatically indicate a person's shoe size when he places his foot on the apparatus. No adjustment or external controls are contemplated in one form of the invention. In a second form a simple one-motion control is utilized.

It is a second object of the invention to provide a foot measuring apparatus having a measuring area and which will automatically register correct shoe size when a foot is placed on this area regardless of the precise location of the foot.

It is another object of this invention to provide a foot measuring apparatus in a tamper-proof housing, with rugged external parts which can withstand contemplated usage.

It is still another object to provide a foot measuring apparatus having relatively movable heel and toe abutment adapted to contact the foot being measured, each abutment being provided with pressure sensitive means connected to a visual indicator by which the customer is apprised of the correct shoe length when both of said pressure sensitive means are actuated by contact with his foot.

These and further objects will be evident from a study of the following description of a preferred form of this invention as illustrated in the accompanying drawings. This form is exemplary, but does not attempt to exhaust the practical possibilities of the invention. Therefore the invention is not to be limited by mere reference to the following disclosure, except as it is restricted by the terms of the annexed claims.

In the drawings:

FIGURE 1 shows a side view of the foot measuring apparatus;

FIGURE 2 shows a side view of the apparatus taken along the side opposite to that seen in FIGURE 1;

FIGURE 3 is a top view of the foot measuring apparatus;

FIGURE 4 is a bottom view of the foot measuring apparatus;

FIGURE 5 is an end view of the foot measuring apparatus taken from the right hand end of FIGURE 1;

FIGURE 6 is an end view of the foot measuring apparatus taken from the left hand end of FIGURE 1;

FIGURE 7 is a fragmentary view taken along line 7—7 in FIGURE 6;

FIGURE 8 is a fragmentary view taken along line 8—8 in FIGURE 6;

2

Figure 9:
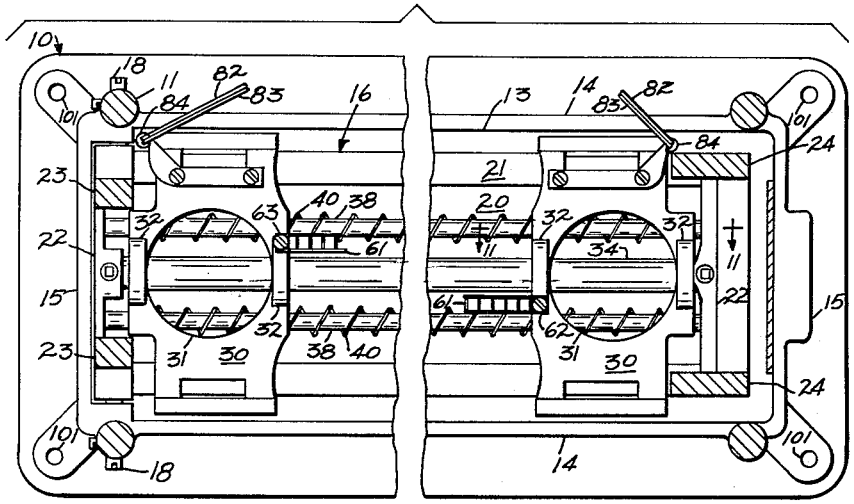
FIGURE 9 is a sectional view taken along line 9—9 in FIGURE 1.
Figure 10:
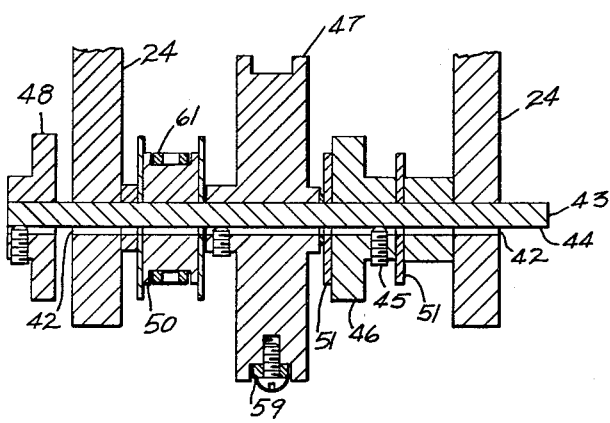
FIGURE 10 is a sectional view of the actuating pulley assembly taken along line 10—10 in FIGURE 6.
Figure 11:
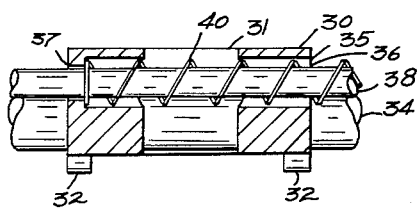

FIGURE 11 is a fragmentary sectional view through an abutment taken along line 11—11 in FIGURE 9;

FIGURE 12 is a sectional view taken along line 12—12 in FIGURE 1 with the area below the foot support being broken away;

FIGURE 13 is a sectional view taken along line 13—13 in FIGURE 2;

FIGURE 14 is a wiring diagram of the indicator lamp circuit;

FIGURE 15 is a wiring diagram of the electrical measurement circuit;

FIGURE 16 is a view of the mechanical indicator system;

FIGURE 17 is a side view similar to FIGURE 2 showing a foot (in dashed lines) being measured;

FIGURE 18 is a view similar to FIGURE 17 showing an alternate placement of the foot;

FIGURE 19 is an enlarged side view of the actuating pulley assembly in a modified form of the invention;

FIGURE 20 is an enlarged side view of the opposite side of the assembly shown in FIGURE 19;

FIGURE 21 is a top view of the invention in a housing;

FIGURE 22 is a side view of the device shown in FIGURE 21;

FIGURE 23 is a top view of a second embodiment of the invention outside the protective cover;

FIGURE 24 is a side view of the embodiment in FIGURE 23;

FIGURE 25 is a side view of the dial and control for the second embodiment of the invention with one side cover broken away;

FIGURE 26 is a sectional view taken along line 26—26 in FIGURE 5.

FIGURE 27 is a side view of a second form of dial and control for the second embodiment of the invention;

FIGURE 28 is a side view taken oppositely to FIGURE 27, with the cover plate removed; and FIGURE 29 is a sectional view cut along line 29—29 in FIGURE 28.

Referring now to the drawings, particularly FIGURES 1-6, the foot measuring apparatus is shown removed from its outer housing. It consists of a frame 10 having four legs 11, a plane upper surface 12 having a rectangular recess 13 cut through surface 12, a pair of bottom longitudinal ribs 14 and a pair of bottom lateral end ribs 15. The ribs 14, 15 surround the lower surface of the recess 13 to strengthen the frame 10.

A foot support 16, having a plane upper surface 17, is pivotally mounted at one end by a pin 18 fixed through one pair of legs 11 in frame 10. The foot support 16 has a rectangular shape and has a recessed lower surface 20 bounded by two plane longitudinal ribs 21 and two lateral ribs 22. The pivoted end of foot support 16 also has a pair of spaced ears 23 extending downwardly. The opposite end of foot support 16 has a pair of larger ears 24 extending downwardly.

Mounted on the foot support 16 for longitudinal translatory motion are heel and toe abutments generally designated as 25 and 26. Abutments 25 and 26 are mirror images of one another and operate in identical fashion. Therefore the same numerals will now be used to designate corresponding elements of each abutment 25, 26. The abutment details are also shown in FIGURES 12 and 13.

Each abutment 25, 26 includes an upstanding portion 27 extending laterally and perpendicularly across the upper surface 17 of foot support 16. This portion 27 is supported on each side by a brace 28 which extends downwardly adjacent to foot support 16 and beyond the projection of ribs 21. Mounted across the lower surface of the foot support 16 is a base 30 which is fixed at each end to one of the braces 28. Base 30 has a circular center recess 31 to lessen its bulk. It is provided with a pair of bosses 32 at each longitudinal end having axial longitudinal apertures 33 which slidably receive a central guide rod 34 mounted between the two lateral ribs 22. The upper surface of the base 30 has a raised section 35 having longitudinal apertures 36 spaced on each side of aperture 33. The apertures 36 have a reduced diameter adjacent the outer ends of the base and formed by shoulders 37. Apertures 36 receive side guide rods 38, also mounted between ribs 22, which have mounted thereon compression springs 40. Springs 40 abut the internal shoulders 37 of the assembled heel and toe abutments 25 and 26 and bias the bases 30 apart from one another.

The central guide rod 34 in apertures 33 and the reduced diameter sections of apertures 36 provide stable sliding support for the heel and toe abutments 25, 26. It can be seen that the abutments actually surround the foot support 16 but touch it only along rods 34 and 38. This provides an effective sliding contact for abutments 25 and 26 along the length of foot support 16. The abutments 25, 26 contact the central areas of the lateral ribs 22 which thereby limit their outward movement due to springs 40.

The foot support 16 has a pair of perpendicular downwardly extending ears 24 formed integrally with it at its end opposite to the pivot pin 18. Rotatably journalled in apertures 42 cut through ears 24 is a shaft 43 having a flattened area 44. This shaft 43 carries the transmission elements which move the heel and toe abutments 25, 26. Locked to the shaft 43 by a set screw 45 is a pinion 46. Also locked to the shaft 43 is a driving pulley 47 and a gear 48 which is mounted outside one ear 24. These components rotate in unison. Rotatably mounted on shaft 43 is an idler pulley 50 and two plates 51 which are located on either side of the pinion 46. Pinion 46 is in mesh with a rack 52 pivotally mounted on the bottom surface of the adjacent end rib 15 of frame 10. See FIGURES 6 and 7. The plates 51 have two guide rollers 53 mounted between them which hold the rack 52 and pinion 46 in meshing engagement during pivotal motion of foot support 16. As an alternative, rack 52 can be formed in a curved configuration conforming to the tangential path of pinion 46.

In operation, pinion 46 will be rotated as foot support 16 is pivoted, due to the meshing engagement of the pinion 46 and rack 52. This rotational motion will be transmitted through shaft 43 to the driving pulley 47 and the gear 48.

A differential pulley arrangement is utilized to transmit the motion of pulley 47 to the heel and toe abutments 25, 26. The purpose of this arrangement is to allow random motion of the abutments 25, 26 so as to measure a foot placed at any location on the surface 17 of foot support 16. A pair of idler pulleys 54, 55 are rotatably mounted at the end of foot support 16 below the pivot pin 18. Pulleys 54, 55 are carried independently by a shaft 56 mounted between the two downwardly extending ears 23 formed integrally with the foot support 16. A differential pulley block 58 having a rotatably mounted pulley 60 is suspended by a first chain 59 connected between the block 58 and the periphery of driving pulley 47. A second chain 61 has a first end connected to gate 25 by a screw 62. It is successively entrained about the idler pulley 50, idler pulley 54, pulley 60, idler pulley 55 and at its remaining end is connected by a screw 63 to base 32 on base 30 connected to abutment 26. This chain construction from pulley 50 to abutment 26 is hidden in FIGURE 4 by the lower flight of chain 61, but may be seen in FIGURES 1, 2, 9, 12, 17 and 18.

Chain 59 transmits motion from the driving pulley to the differential block 58. Block 58 will move a linear distance equal to the peripheral motion of the pulley 47. This motion is then transmitted to each of the abutments 25, 26 so that the relative motion between abutments 25, 26 is equal to twice the peripheral displacement of chain 59 on driving pulley 47. If motion of one abutment 25 or 26 is blocked by a person's foot, the remaining abutment will travel twice its normal distance so as to maintain the identical relative displacement between the two abutments 25, 26 for a given amount of rotation of driving pulley 47.

The two chains 59, 61 also serve to return the foot support 16 to its normal position when the pressure of a person's foot is removed from foot support 16. The return pressure is created by the compressive force of springs 40 on abutments 25, 26. This force is transmitted in reverse through chain 61 to block 58 and then through chain 59 to the driving pulley 47. Driving pulley 47 then serves to rotate shaft 43 and pinion 46 which then rides up rack 52 to move foot support 16 upwardly. The rest position of foot support 16 is limited by a stop 64 fixed to one ear 24. Stop 64 abuts the end rib 15 to define the upper limit of pivotal motion of foot support 16 about pin 18.

Obviously, when the two abutments 25, 26 abut a person's foot, his correct shoe size can be related to the motion of the driving pulley 47. To indicate exactly when this proper pressure is attained, an indicator apparatus is provided. This apparatus consists of an electrical circuit shown in FIGURE 14. An indicator lamp 64 may be provided at any convenient location. Lamp 64 may be implemented with an audible sounding device or any desirable indication mechanism. A battery is provided at 65 to energize lamp 64. A pair of pressure actuated normally-open switches 66, 67 are provided respectively on gates 25, 26. The switches are located so as to close when the respective abutment abuts the foot being measured. The battery 65, lamp 64 and switches 66, 67 are connected in series so that both switches 66, 67 must be closed before energization of lamp 64 is accomplished.

The details of switch 66 can be seen in FIGURES 12 and 13. The upstanding portion 27 of abutment 25 mounts a parallel pressure plate 68 which slides on a double guide rod 70 at one side and a limiting screw 71 at the remaining side. Screw 71 is secured to portion 27 by a nut 72 and is slidably received through an aperture cut through the plate 68. A pin 73 is fixed to plate 68 and extends through the portion 27.

Pin 73 abuts a larger diameter pin 74 fixed to a spring conductor 75. Conductor 75 is mounted on an insulating block 76 fixed to the back surface of portion 27. Block 76 also mounts a second conductor 77. Conductors 75, 77 are provided with contact points 78, 80 respectively which are aligned so as to make proper electrical contact when conductor 75 is urged toward conductor 77. A curved back plate 81 is secured to the back surface of portion 27 to protect the conductors 75, 77 from damage. The conductors 75, 76 are connected to wires 82, 83 respectively which are guided along portion 27 by a tube 84. The wires 82, 83 are connected in the wiring circuit of the indicator circuit in the fashion illustrated in FIGURE 14.

The amount of movement of foot support 16 about pin 18 is measured mechanically in the first embodiment shown. The gear 48 has a plate 79 fixed adjacent to it and mounted on ear 24. A driven gear 85 is mounted on plate 79 in mesh with gear 48. A cover 86 is mounted on the plate 79 over gear 85 and is spaced parallel to plate 79 by means of spacers 87 and screws 88. The cover 86 is provided with a collar 89 having external threads. A Bowden cable 90 of conventional construction is provided with a mating coupling 91 attached to its sheath 92 adapted to be anchored to collar 89. The interior cable 93 has a square lug 94 at its end adapted to fit within a complementary socket 95 in the axle of gear 48. Thus, rotation of gear 48 is directly transferred to the cable 93.

As shown in FIGURE 16 the cable 90 is connected to a gauge consisting of a rotatable disk 96 and a base plate 97. The sheath 92 is locked to the base plate 97 by means of a conventional coupler 98. The inner cable 93 is secured to the disk 96 and supports the disk 96 for rotation. Disk 96 is suitably calibrated to show shoe sizes.

The entire assembly is contained in a housing 100 shown in FIGURES 21 and 22. This housing is merely formed of cast material and has an open bottom through which the assembly is inserted. The frame 10 is held by screws secured through holes 101. The upper surface of housing 100 has a rectangular opening bounded by upwardly extending walls 102. Walls 102 are designed to enclose and protect the abutment 25, 26. A forward portion of the housing 100 has a circular area under which the base 97 is secured. A glass or plastic lens 103 opens through the top of the circular area and provides a visual opening for reading of the calibrated upper surface of disk 96. The lamp 64 in the indicator is preferably located within housing 100 adjacent lens 103 so as to illuminate the visual portion of the disk 96 when pressure is applied against both abutments 25, 26. A socket 99 is provided on housing 100 and is adapted to mount a standard for instructions.

The general operation of the mechanism is quite simple and can best be seen in FIGURES 17 and 18. In FIGURE 17 the foot 104 has been placed adjacent to the abutment 26 so that motion of this abutment is blocked and switch 66 is closed initially. The pressure exerted by foot 104 pivots foot support 16 about pin 18. This causes rotation of shaft 43 due to the action of pinion 46 and rack 52. This rotates the driving pulley 47 to pull differential pulley block 58 to the right and thereby move abutment 25. When abutment 25 abuts the foot 104 as shown, the switch 67 is closed and lamp 64 is energized to illuminate the disk 96. The individual can then read his shoe size on disk 96 and is enabled to choose correctly fitting shoes.

Downward motion of foot support 16 is limited in practical use by the pressure exerted by the foot of the person using the apparatus. Illumination of disk 96 by lamp 64 serves as a visual indication that no additional pressure is required for accurate measurement of one's foot.

FIGURE 18 shows the operation of the heel and toe abutments 25, 26 when the foot 105 is placed at a position spaced from each abutment 25, 26. The differential motion of block 58 will bring both abutments 25, 26 together until each abuts the foot 105. Again, energization of lamp 64 serves as a signal to read the shoe size on disk 96. When the foot 104 or 105 has been removed, springs 40 will return the abutments 25, 26 to their original positions and the switches 66, 67 will be opened due to the spring action of conductors 75.

Disk 96 may be calibrated in a readable scale by adjustment of the sizes of pinion 46, driving pulley 47 and gears 48, 85. Such variations are well within the skill of one trained in this art and may be carried out in any desired combination. The scale or disk 96 will be linear, since all motion transmitting parts assume linear relationships with respect to each other.

A modified form of the measuring system is illustrated in FIGURES 15, 19 and 20. In this form a rheostat 106 is geared directly to the gear 48 and is mounted on plate 79. The resistance of rheostat 106 will vary linearly according to the angular position of gear 48. At the remaining end of shaft 43 is secured a cam 107 having a raised step 108. A plate 110 located on the adjacent ear 24 has a microswitch 111 mounted upon it. Switch 111 includes an actuator pin 112 which abuts a lever 113 pivoted to plate 110. A roller 114 or lever 113 travels along the periphery of cam 107. Switch 111 is normally open in the rest position indicated in FIGURE 19. In this position, no weight is on foot support 16. When pressure is exerted on foot support 16, cam 107 will be rotated by shaft 43 in the direction of the arrow in FIGURE 19. The roller 114 will then clear step 108 and switch 111 will close.

The wiring diagram for the measurement circuit is shown in FIGURE 15. A battery 115 is wired in series with switch 111 and rheostat 106. An ammeter 116 is wired in series with a variable resistance 117 and is connected across the rheostat 106 to measure the amperage conducted from one terminal of the rheostat to its variable element. The purpose of switch 111 is to conserve battery 115 while the apparatus is not in use.

Ammeter 116 can be placed in the housing 110 in place of disk 96 and the dial of the ammeter 116 can be marked in shoe sizes. The resistance 117 is used to provide initial adjustment of the ammeter 116 for accuracy.

A second embodiment of the measuring apparatus is illustrated in FIGURES 23–29 utilizing a stationary measuring area. The basic assembly is analogous to that described above and similar numerals will designate corresponding parts. The reason for this embodiment lies in the intended use of the invention. When measuring small feet, such as children's, it is necessary to exert additional force on surface 17 of foot support 16 to bring heel and toe abutments 25 and 26 together. In order to overcome this difficulty, a mechanical system is contemplated which will move heel and toe abutments 25' and 26' of the following embodiment without foot pressure.

The general arrangement of the second embodiment contemplates a frame 10', having four legs 11' and an upper surface 12'. The ribs 14' and 15' are as before for strength. The top 12' extends across the full length and width of frame 10' and is broken by two parallel spaced longitudinal slots 120. Thus the foot support 17' formed between slots 120 is formed as an integral stationary part of frame 10'.

Slidably mounted over foot support 17' are two abutments 25', 26' having structure identical to that described with respect to the first embodiment, including the pressure switch arrangement. The abutments 25', 26' are mounted through slots 120 and are guided under foot support 17' for longitudinal motion by the guiding and biasing elements earlier described. Slots 120 act as limiting stops of outward movement of abutment 25', 26'.

In this embodiment abutments 25', 26' are to be pulled toward each other in response to upward motion of a control chain 121, which is guided around a pulley 122 rotatably journalled on shaft 43' which is mounted between ears 24'. Control chain 121 is fastened to differential block 58'. Block 58' is connected to abutments 25', 26' by means of a chain 59' wrapped around differential pulley 60. Chain 59' extends over idler pulley 55' to the bottom of abutment 26' and over a twin idler pulley to a third idler pulley 50' on shaft 43' and then to the bottom of abutment 25'. Thus, upward motion of chain 121 will draw abutments 25', 26' together, while release of chain 121 will allow the biasing spring to force abutments 25', 26' apart.

One mechanism by which chain 121 is pulled upward is illustrated in FIGURES 25, 26. A cylindrical housing 123 is secured to an upright standard 123 of tubular material through which chain 121 passes. A crank shaft 125 is rotatably journalled through the axis of the housing 123 and has a crank handle 126 secured to one outer end thereof. A collar 127 of bearing material is rotatably journalled on the crank shaft 125. Fixed to collar 127 is a pulley 128, which has secured thereto the upper end of chain 121. Adjacent pulley 128 is a calibrated disk 130 having peripheral markings indicative of shoe sizes. Fastened between collar 127 and crank shaft 125 is a coiled spring 131 having its ends respectively fastened to these two independently rotatable parts. Spring 131 is oriented so as to transfer motion from crank shaft 125 to collar 127.

The operation of this combination is very simple. A shoe size can be determined by placing one's foot on foot support 17' and turning crank handle 126 in the direction of arrow 132 until it strikes a fixed stop 133 formed on the interior of housing 123. When this occurs, spring 131 will turn pulley 128 to thereby draw abutments 25', 26' into contact with the foot on foot support 17'. When both abutments 25', 26' have made contact, chain 121 will not move and will hold pulley 128 and disk 130 in the position indicative of the correct shoe size as viewed through a lens 134 and which may be illuminated as previously described. Excess motion of crank handle 126 will be absorbed in spring 131.

This apparatus can be housed in the protective cover previously described with the only modification being the addition of standard 124 to support housing 123 and protect chain 121. This embodiment has the advantage of using fewer moving parts and therefore providing less chance of accidental or willful damage in public usage. It eliminates the problem of gauging foot pressure on a movable treadle.

A second and more refined dial and control apparatus is illustrated in FIGURES 27–29. This apparatus is housed in a protective casing 135 having a removable side plate 136 which is shown removed in FIGURE 28. Casing 135 is provided with the same type viewing lens 134 and is mounted on standard 124 as have been previously described.

The apparatus of FIGURES 27–29 is designed for extremely accurate self-measurement of feet placed on the fixed support 17'. The prior devices described herein are satisfactory only so long as undue endwise pressure is not exerted on the foot by abutments 25', 26'. This variance in pressure can result in an appreciable error in the measurement of foot size. For this reason, the apparatus described below positively stops motion of abutments 25', 26' and the readable dial when proper contact with the foot has been made by abutments 25', 26'. Also, an additional safety brake is provided to prevent damage to the apparatus by one suddenly releasing the control handle during use of the apparatus.

The apparatus uses a crank shaft 137 and a crank handle 138 which are bearingly supported for rotation by the wall of casing 135 and by plate 136. A central hub 139 is rotatably journalled on shaft 137. Hub 139 has the dial ring 140 adjustably mounted thereon. The ring 140 is clamped to hub 139 by means of a washer 141 and screw 142. Relative motion of ring 140 may be effected by means of a spring arm 143 on hub 139, which surrounds a protruding pin 144 on ring 140. At the periphery of ring 140 is a translucent dial 145 on which suitable size markings may be printed.

The hub 139 has an annular recess 146 which is fixed to and carries the upper end of chain 121 which can be wrapped thereon. Adjacent recess 146 is a ratchet wheel 147 which shall be described below.

Fixed to shaft 137 is a ring 148 having a protruding lug 149 directed radially outward. Between the ring 148 and hub 139 is a second ring 150 which is rotatable relative to shaft 137, but which is normally fixed to ring 148 by a removable pin 151. An axial spring 152 surrounds the adjacent collar 153 of hub 139 and has one end anchored to hub 139. The remaining end of spring 152 is fixed to ring 150. By turning ring 152 relative to ring 148 one may adjust the tension of spring 152. The hub 139 has an axially projected lug 154 which intersects the path of lug 149.

In practice, turning of handle 138 in the direction shown by arrow 155 (FIGURE 27) will cause spring 152 to pull hub 139 and dial 145 about the shaft axis until motion of dial 145 is arrested through chain 121 when both abutments 25', 26' contact the foot. At this position, the dial 145 and hub 139 will remain stationary and further movement of handle 138 will merely wind the spring 152. When the handle 138 is returned to its original position, lug 149 will push against lug 154 to insure proper positioning of dial 145.

To prevent motion of dial 145 after proper contact of the foot has been made by contacts 25', 26', a pawl 156 is pivotally mounted on casing 135, as shown in FIGURE 28. Pawl 156 is movable about a pivot 157 from a position out of engagement with the periphery of ratchet wheel 147 to a position in engagement therewith. This motion of pawl 156 is gained through a crank arm 158 linked to a movable element 159 of a small solenoid 160. When solenoid 160 is energized, element 159 is raised, thereby causing pawl 156 to engage ratchet wheel 147. Thus motion of abutments 25', 26' is positively prevented, eliminating error and any chance of injury to a small or weak foot.

The apparatus is provided with a lamp 161 on a standard 162. Lamp 161 is directly below dial 145 and illuminates the dial 145 for viewing when the switches of abutments 25', 26' are closed. The solenoid 160 is wired in parallel with lamp 161 so as to be energized simultaneously therewith.

Due to the spring return of handle 138, the apparatus could be damaged by sudden release of handle 138. Stops 163, 164 limit the possible rotational movement of handle 138. A sheave 165 fixed to shaft 137 is engaged by a frictional member 166, such as a length of rope, anchored at one end to casing 135 and at the other end to a spring 167. The position of spring 167 is chosen so that forward motion of handle 138 will pull on spring 167 and loosen the engagement of member 166 on sheave 165, while a sudden release of handle 138 will cause member 166 to partially grip sheave 165 to retard its movement. Either of the anchored ends of member 166 may be longitudinally adjustable in order to accurately set the tension desired in the member 166.

Various modifications in this device will be obvious to one skilled in this field. For instance, it has been found that two of the idler pulleys (50 and 54) may be eliminated in the differential pulley arrangement without detracting from the effective nature of this flexible system. Other mechanical changes will undoubtedly arise, and for this reason, only the following claims are intended to define my invention.

Having thus described my invention, I claim:

1. A foot measuring apparatus comprising:
   a stationary frame;
   a foot support on said frame;
   abutment means mounted on said foot support for translational motion relative to said foot support, said abutment means including first and second foot engaging abutments;
   biasing means on said foot support operatively connected to said abutment means adapted to normally urge said abutment means apart;
   and means on said foot support and said frame operatively connected to said abutment means adapted to selectively move said abutment means toward one another, said means including controls adapted to prevent further motion of an abutment upon initial contact of the abutment with the foot being measured.

2. A foot measuring apparatus comprising:
   a stationary frame;
   a foot support on said frame;
   individually movable heel and toe abutments extending transversely over the top surface of said foot support and mounted for independent translational motion relative to one another along the length of said foot support;
   biasing means mounted on said support operatively connected to said heel and toe abutments adapted to urge said abutments apart from one another;
   and differential pulley means operatively connected to said heel and toe abutments adapted, when operated, to effect translational motion of the heel and toe abutments relative to one another in a direction toward one another.

3. A foot measuring apparatus comprising:
a stationary frame;
a foot support on said frame;
heel and toe abutments each extending across the width of said foot support and being individually mounted for translational motion along the length of said foot support;
biasing means mounted on said foot support operatively connected to said heel and toe abutments adapted to urge said abutments apart;
motion limiting means on said foot support interposed in the outward path of each abutment adapted to limit its movement in response to said spring means;
differential pulley means on said foot support adapted to move said heel and toe abutments, said differential pulley means comprising a flexible member, idler pulley means rotatably journalled on one end of said foot support, a differential block, said flexible member being fixed at one end to a first one of said heel and toe abutments and being entrained in order about said idler pulley means and said differential block, and having its remaining end fixed to the second one of said heel and toe abutments, flexible means connected at one end to said block and connected at its remaining end to an actuating means adapted to pull said flexible means so as to bring said heel and toe abutments toward each other.

4. A foot measuring apparatus comprising:
a stationary frame;
a foot support having one end pivotally mounted on said frame for movement about an axis transverse to its length;
heel and toe abutment means mounted on said foot support for longitudinal motion with respect to the foot support;
biasing means on said foot support operatively connected to said heel and toe abutment means adapted to urge said heel and toe abutment means outward from the center of said foot support;
and cooperating means on said foot support and said frame operatively connected to said heel and toe abutment means adapted to move said heel and toe abutment means inwardly in opposition to said biasing means in response to pivotal motion of said foot support in one direction about said axis.

5. A foot measuring apparatus comprising:
a stationary frame;
a foot support having one end pivotally mounted on said frame for movement about an axis transverse to its length;
heel and toe abutment means mounted on said foot support for longitudinal motion with respect to the foot support;
biasing means on said foot support operatively connected to said heel and toe abutment means adapted to urge said heel and toe abutment means outward from the center of said foot support;
pinion means rotatably mounted on said foot support;
rack means mounted on said frame in meshing engagement with said pinion means, said pinion means including a pulley operatively connected to said pinion means and to said heel and toe abutment means adapted to move said heel and toe abutment means inwardly in opposition to said biasing means in response to rotation of said pinion means caused by pivotal motion of said foot support in one direction about said axis.

6. The invention as defined in claim 5 further including means operatively connected to said pinion means and adapted to indicate the amount of angular rotation of said pinion means.

7. The invention as defined in claim 5 including:
flexible cable means operatively connected to said pinion means;
and dial means connected to said flexible cable means and being calibrated to indicate angular motion of said dial means in the desired measurement units.

8. The invention as defined in claim 5 including:
a variable resistance having its control means operatively connected to said pinion means;
and an electrical meter circuit including said variable resistance and adapted to visually indicate changes in resistance as indicated on the meter.

9. A foot measuring apparatus comprising:
a stationary frame;
a foot support having one end pivotally mounted on said frame for movement about an axis transverse to its length;
heel and toe abutments, each extending across the width of said foot support and being individually mounted for translation along the length of said foot support;
spring means mounted on said foot support and operatively connected to said heel and toe abutments adapted to urge said abutments apart;
fixed stop means on said foot support in the outward path of each abutment adapted to limit its movement in response to said spring means;
means on said foot support operatively connected to said heel and toe abutments adapted, when actuated, to effect relative motion between the heel and toe abutments toward one another in opposition to said spring means;
and cooperating means on said foot support and on said frame operatively connected to said last-named means adapted to actuate said last-named means in response to pivotal motion of said foot support.

10. The invention as defined in claim 9 further including:
first and second normally open pressure operated switches mounted respectively on said heel and toe abutments; said first and second pressure operated switches being wired in series in an indicator circuit including a visible electric lamp, whereby said lamp is adapted to be lighted when pressure is exerted on both of said pressure operated switches.

11. The invention as defined in claim 9 further including:
first and second normally open pressure operated switches mounted respectively on said pair of gates, said switches being wired in series in an electrical circuit with an indicator means, whereby said indicator means is energized by concurrent actuation of said switches.

12. A foot measuring apparatus comprising:
a stationary frame;
a foot support having one end pivotally mounted on said frame for movement about an axis transverse to its length;
heel and toe abutments each extending across the width of said foot support and being individually mounted for translational motion along the length of said foot support;
spring means mounted on said foot support and operatively connected to said heel and toe abutments adapted to urge said abutments apart;
fixed stop means on said foot support in the outward path of each abutment adapted to limit its movement in response to said spring means;
differential pulley means on said foot support adapted to move said heel and toe abutments, said differential pulley means comprising a flexible member, idle pulley means rotatably journalled on one end of said foot support, a differential block, said flexible member being fixed at one end to a first one of said heel and toe abutments and being entrained in order about said idler pulley means and said differential block and having its remaining end fixed to the second one of said heel and toe abutments;

and cooperating means on said foot support and frame operatively connected to said differential pulley means adapted to move said differential block in response to pivotal motion of said foot support.

13. A foot measuring apparatus comprising:

a frame;

a foot support pivoted to said frame at one of its ends about a horizontal axis transverse to its length, said foot support being provided with stop means adapted to abut said frame to limit upward motion of its remaining end;

biasing means on said foot support and said frame adapted to urge said remaining end of said foot support in an upward direction;

abutment means on the upper surface of said foot support mounted for longitudinal motion along said foot support and operatively connected to said biasing means to be moved thereby;

and indicator means operatively connected to said foot support adapted to indicate the angular position of said foot support about said axis.

14. A foot measuring apparatus comprising:

a frame;

a foot support pivoted to said frame at one of its ends about an axis transverse to its length, said foot support being provided with stop means adapted to abut said frame to limit upward motion of its remaining end;

heel and toe abutments mounted across the upper surface of said foot support and being independently slidably mounted on said foot support;

differential pulley means mounted on said foot support and connected to said heel and toe abutments;

cooperating positive transmission means on said foot support and said frame operatively connected to said differential pulley means adapted to move said heel and toe abutments toward one another in response to downward motion of said remaining end of said foot support;

biasing means on said foot support in contact with said heel and toe abutments adapted to urge said abutments apart;

and indicator means connected to said transmission means adapted to indicate the angular position of said foot support with respect to said axis.

15. A foot measuring apparatus comprising:

a stationary frame;

a foot support formed rigidly with said frame;

heel and toe abutment means mounted on said foot support independently of one another for longitudinal motion with respect to the foot support;

biasing means on said foot support operatively connected to said heel and toe abutment means adapted to urge said heel and toe abutment means apart;

and differential pulley means operatively connected to said heel and toe abutment means adapted, when activated, to effect translational motion of said heel and toe abutment means relative to one another in a direction toward one another in opposition to said biasing means.

16. A foot measuring apparatus comprising:

a stationary frame;

a foot support formed integrally with said frame;

a pair of heel and toe abutments each extending across the width of said foot support and being individually mounted for translational motion along the length of said foot support;

biasing means mounted on said foot support and operatively connected to said heel and toe abutments adapted to urge said abutments apart;

differential pulley means on said foot support adapted to move said heel and toe abutments, said differential pulley means comprising a flexible member, idle pulley means rotatably journalled on one end of said foot support, a differential block, said flexible member being fixed at one end to a first one of said heel and toe abutments and being entrained in order about said idler pulley means and said differential block, and having its remaining end fixed to the second one of said heel and toe abutments;

and operating means mounted on said frame operatively connected to said differential block adapted to exert tension on said flexible member to thereby move said heel and toe abutments relative to one another.

17. The device as defined in claim 16 wherein said operating means comprises:

a crank shaft rotatably journalled by a member fixed on said frame;

a crank arm attached to said crank shaft;

a pulley rotatably journalled on said crank shaft;

a coiled spring operatively connected between said crank shaft and said pulley;

a flexible motion transmitting member attached at one end to said differential block and attached at its remaining end to said pulley, whereby motion of said crank arm will be transmitted by said coiled spring to said pulley;

a ratchet wheel fixed relative to said pulley and rotatable therewith;

a cooperative pawl mounted on said frame adjacent said ratchet wheel for motion between a first position in engagement with the ratchet wheel and a second position out of engagement therewith;

and means on said frame and on each of said abutments operatively connected to said pawl adapted to place said pawl in said first position when each abutment has contacted a foot being measured on said foot support.

18. The device as defined in claim 16 wherein said operating means comprises:

a crank shaft rotatably journalled by a member fixed on said frame;

a crank arm attached to said crank shaft;

a pulley rotatably journalled on said crank shaft;

a coiled spring operatively connected between said crank shaft and said pulley;

a flexible motion transmitting member attached at one end to said differential block and attached at its remaining end to said pulley, whereby motion of said crank arm will be transmitted by said coiled spring to said pulley;

and a calibrated disk fixed relative to said pulley, said calibrated disk being marked to indicate the relative position of the heel and toe abutments with respect to each other.

19. The device as defined in claim 16 wherein said operating means comprises:

a crank shaft rotatably journalled by a member fixed on said frame;

a crank arm attached to said crank shaft;

a pulley rotatably journalled on said crank shaft;

a coiled spring operatively connected between said crank shaft and said pulley;

a flexible motion transmitting member attached at one end to said differential block and attached at its remaining end to said pulley, whereby motion of said crank arm will be transmitted by said coiled spring to said pulley;

brake means on said pulley and said frame adapted, when energized, to prevent motion of said pulley relative to said frame;

and means on said frame and on each of said abutments operatively connected to said brake means adapted to energize said brake means when each abutment has contacted a foot being measured on said foot support.

20. A device as defined in 16 wherein said operating means comprises:
- a crank shaft rotatably journalled by a member fixed on said frame;
- a crank arm attached to said crank shaft;
- a pulley rotatably journalled on said crank shaft;
- a coiled spring operatively connected between said crank shaft and said pulley;
- and a flexible motion transmitting member attached at one end to said differential block and attached at its remaining end to said pulley, whereby motion of said crank arm will be transmitted by said coiled spring to said pulley.

No references cited.